Figure 6:
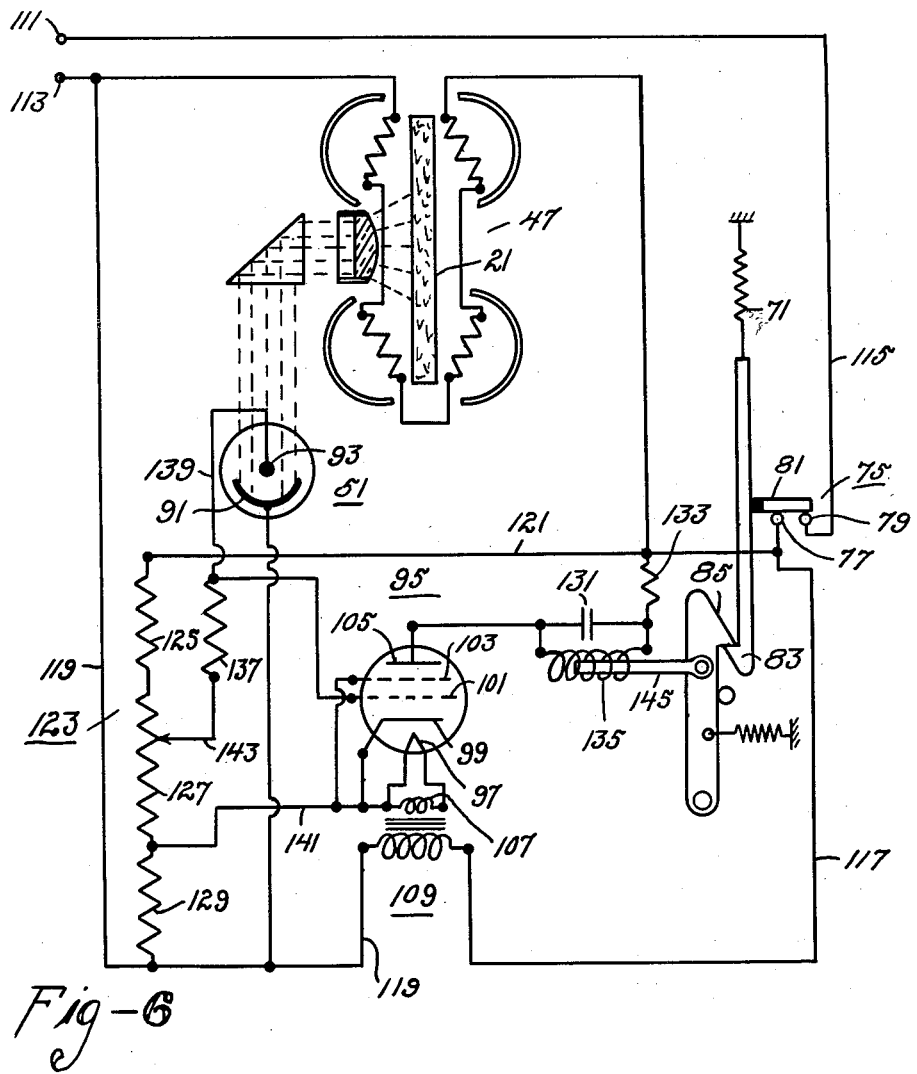

March 17, 1953     B. G. OLVING     2,631,523
AUTOMATIC ELECTRIC TOASTER
Filed April 11, 1947     3 Sheets-Sheet 1
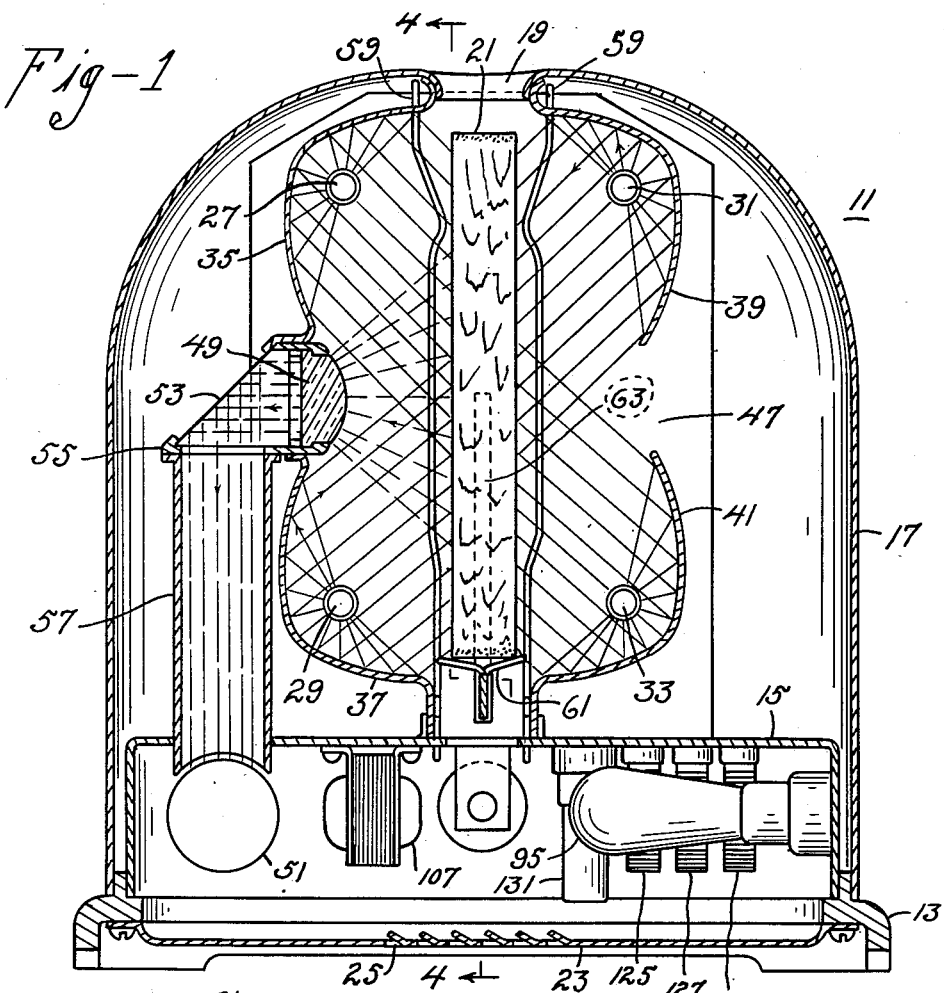
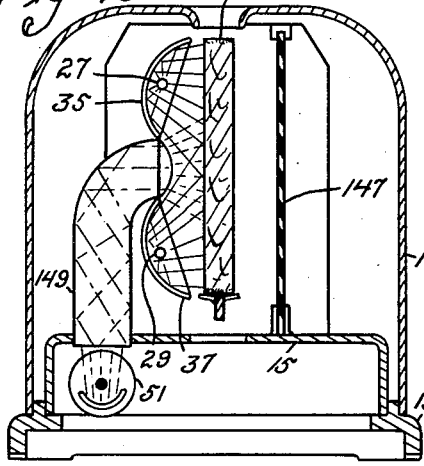
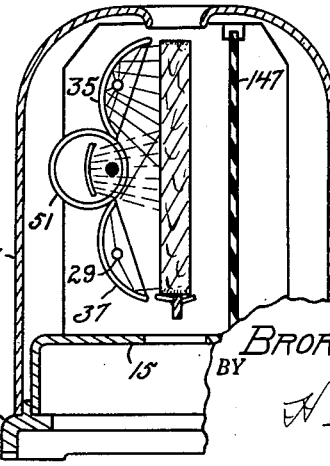
INVENTOR.
BROR G. OLVING March 17, 1953 B. G. OLVING 2,631,523
AUTOMATIC ELECTRIC TOASTER
Filed April 11, 1947 3 Sheets-Sheet 2
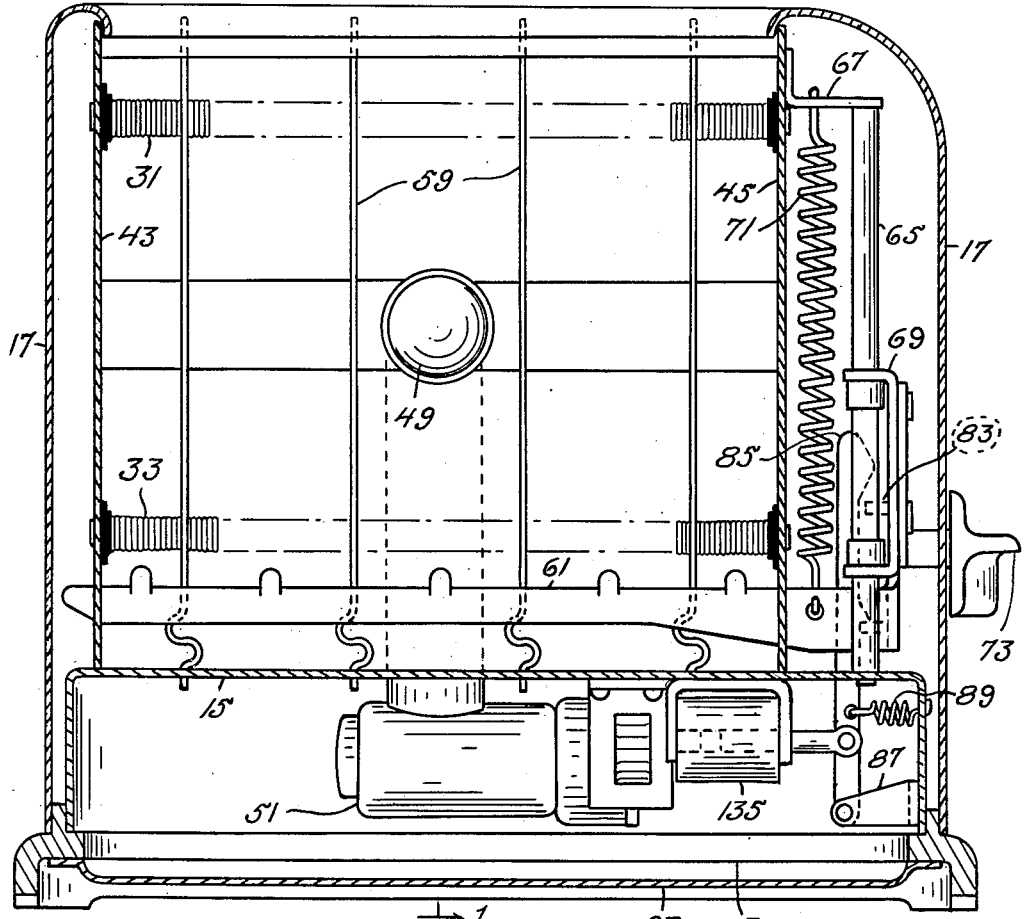
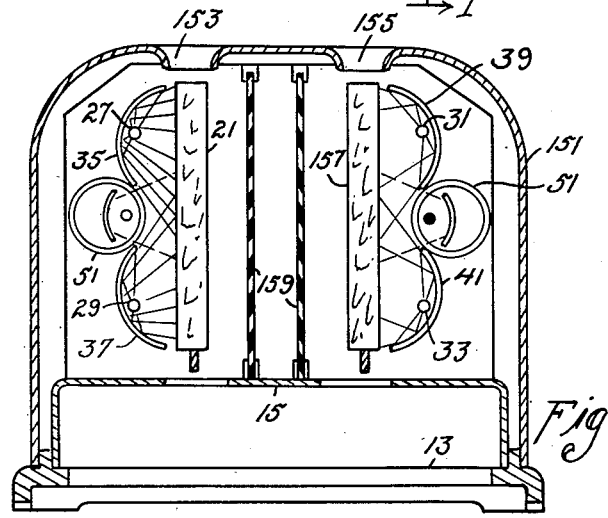
INVENTOR.
BROR G. OLVING
BY H. M. Bielel
ATT'Y Patented Mar. 17, 1953

2,631,523

UNITED STATES PATENT OFFICE 2,631,523

AUTOMATIC ELECTRIC TOASTER

Bror G. Olving, Elgin, Ill., assignor to McGraw Electric Company, Elgin, Ill., a corporation of Delaware Application April 11, 1947, Serial No. 740,788

6 Claims. (Cl. 99—326)

My invention relates to electric toasters.

An object of my invention is to provide an electric toaster with light-sensitive means for terminating a toasting cycle.

Another object of my invention is to provide an electric toaster having a novel form of means for transmitting light from a slice of bread being toasted to a light-sensitive cell.

Another object of my invention is to provide a novel and relatively simple construction in an electric toaster using a light-sensitive cell as a means for terminating a toasting cycle.

Other objects of my invention will either be apparent from a description of several forms of device embodying my invention or will be pointed out in the course of such description and be set forth in the appended claims.

In the drawings,

Figure 1 is a vertical lateral sectional view of an electric toaster embodying my invention, taken on the line 1—1 of Fig. 4, Fig. 2 is a modification, shown on a reduced scale, of the device shown in Fig. 1, Fig. 3 is a modification of the device shown in Fig. 2, Fig. 4 is a vertical sectional view taken on the line 4—4 of Fig. 1, Fig. 5 is a vertical lateral sectional view on a reduced scale, showing a two-slice toaster, and Fig. 6 is a diagram of electrical circuits for control of the toaster of Figs. 1 and 4.

The toaster embodying my invention depends upon the termination of a toasting operation which is controlled by electronic means of the photo-electric cell type. The mechanical arrangement and thermal association of the parts, as well as the layout of the electric circuits and its components, are all new and novel. The automatic termination of a toasting operation is determined entirely by a change in color of the pieces of toast produced thereby—that is, the length of a toasting cycle is controlled directly by a change in the physical condition of the pieces of bread being toasted in contrast to the indirect type of timing means employed in the toasters now on the market.

The toaster control circuit described in this disclosure employs a photo-electric element responsive to the visible light spectrum. I am aware of an earlier patent doing substantially the same thing but I wish to here point out that that patent does not show any specific means for accomplishing the result desired, whereas my invention discloses several means for accomplishing the desired result.

The various electronic parts and components required for the circuit, such as the photo-electric element, the amplifier tube and the relay, are available in the present day market at a reasonable cost and the mechanical assembly of the various parts presents no difficulty. All of these component parts are of reliable and time-tested design and are rugged and sufficiently strong to withstand normal abuse and handling over long periods of time.

Broadly, visible light generated by specially designed heating elements is reflected from a slice of bread being toasted, enters an optical system through a light-condensing lens facing a large portion of a slice of bread and is reflected by a prism or a small mirror or is conveyed as "piped" light through a transparent light conductor to the aperture of a photo-electric cell located preferably in the bottom compartment of a toaster. The electric current passing through the photocell acts as a trigger for an amplifier tube capable of operating a relay controlling the main switch of the toaster.

The type of circuit employed is such that the relay will open the toaster circuit when the light reflected from a slice of bread decreases to a low critical value—that is, when the toast has been browned to a sufficient degree. The critical value at which the relay operates can be adjusted to any desired value by turning the control knob of one of the resistors in the circuit, thereby making it possible to change the degree of toasting or browning over any range desired.

Referring now to Fig. 1 and Fig. 4 of the drawings, I have there illustrated a toaster, designated in its entirety by numeral 11 and comprising a base 13 which may be of some plastic material and which has mounted on and secured to its upper surface a base member 15 which is preferably made of thin sheet metal and is of substantially inverted disc shape. I provide also an outer casing 17 which is provided with a slot 19 in its upper portion to permit of introducing a slice of bread 21 into the toaster and of removing the toasted slice of bread at the end of a toasting operation. I provide also a lower plate 23 secured to the lower surface of member 13, this plate being provided with a plurality of louvres 25 to permit of a draft of cooling air to flow into the toaster casing and upwardly and outwardly through opening 19. While I have not shown details of the outer casing 17 I desire it to be understood that any kind of outer casing may be used.

I provide a plurality of toast heating elements 27, 29, 31 and 33 which are located one at the top and one at the bottom of the toasting chamber at each side of a slice of bread to be toasted. Each of the heating elements is of generally rod shape and they may be made of resistance wire wound upon a dielectric support or they may be plain carbonaceous rods having the desired resistance.

Each of the toast heating elements 27, 29, 31 and 33 is located on or in the focal axis of four parabolic heat reflectors 35, 37, 39 and 41 which extend from a rear intermediate wall 43 to a front intermediate wall 45 and are secured thereto. The general shape of each parabolic heating reflector is such as to leave a rectangular opening or slit 47 between the lower edge of the upper reflectors 35 and 39 and the upper edge of the lower reflectors 37 and 41. The parabolic reflectors may be made of a metal having a highly polished inner surface for efficient reflection of the heat and light rays generated by the toast heating elements and it is a very desirable condition that the parabolic reflectors be rectangular and retain a highly polished inner surface for an indefinite length of time of use.

As shown in Fig. 1 of the drawings, the heat rays reflected from one-half of the upper reflector transmit heat to approximately the upper one-third of the surface of the slice of bread, while the heat rays from the lower half of the upper reflector transmit heat to the central one-third portion of the slice of bread. Considering the lower reflector, the lower half of the reflector transmits heat to the lower one-third of the slice of bread being toasted, while the upper half of the lower reflector transmits heat to the central one-third portion of a slice of bread being toasted. It is evident that heat is distributed fairly uniformly over the entire surface of a slice of bread since the central portion of a slice of bread which is facing the opening 47 between the two reflectors is supplied with heat from both the upper and the lower heating elements. The heat from the upper and lower toast heating elements thus supplement each other in such a manner that all portions or points on the surface of a slice of bread being toasted receive an approximately equal amount of heat. I desire to here point out that the contour or shape of the heat reflectors do not necessarily have to be made in the form of a mathematical parabola but may deviate from such a cross-section in order to produce the most practical and uniform distribution of heat over the entire surface of a slice of bread being toasted.

A lens 49, made of heat-resisting glass, is mounted in the open space between the two reflectors 35 and 37 so that the face of the lens is parallel with the surface of a slice of bread and is located opposite the center of a slice of bread. The lens 49 is of the wide-angle type in order to "see" a major portion of the surface of a slice of bread, that is, visible light rays from almost all of the bread surface can be "seen" by the lens.

A photo-electric cell 51 is located in a relatively cool portion of the bottom compartment of the toaster and a right angle prism 53, which is preferably made of heat-resisting glass, reflects the light rays from the lens 49 to the photo-electric cell 51. I have shown in Fig. 1 of the drawings a fixture 55 for supporting both the lens 49 and the right angle prism 53, fixture 55 being supported by reflectors 35 and 37 in opening 47 therebetween. I may here point out that the louvres 25 are adapted to aid in maintaining the temperature of the light-sensitive cell 51 at a relatively low value by the cool air flowing therethrough, as hereinbefore set forth. A tube 57 is adapted to conduct the light from prism 53 to light-sensitive cell 51.

I provide a plurality of guide or guard wires 59 for holding slices of bread substantially centrally between the opposed pairs of upper and lower toast heating elements.

I provide a bread carrier 61, with its rear end portion adapted to move in a slot 63 in the rear intermediate wall 43 and its front portion moving in a similar slot in the front intermediate wall 45. Means for supporting said bread carrier 61 comprises a vertical cylindrical rod 65, the upper end of which is supported by a bracket 67 while its lower end is supported by member 15. A carriage 69 is adapted to slide on rod 65, carrier 61 being normally biased into a non-toasting position as by a coil spring 71 having its upper end secured to bracket 67 while its lower end is hooked into the front portion of carrier 61. A knob 73 is secured to carrier 61 in front of the front wall of outer casing 17 so that the user of the toaster may move the bread carrier 61 into toasting or lower position substantially as shown by bread slice 21 in Fig. 1 of the drawings.

A main switch 75 of the toaster comprises two fixed contacts 77 and 79 and a contact-bridging member 81 mounted on the carrier 61 and adapted to engage the two fixed contacts 77 and 79 when an operator has pressed downwardly on knob 73 and has moved carrier 61 into its lower or toasting position. A latch 83 mounted on carriage 69 is adapted to engage with a catch 85 which is of rod shape and has its lower end pivotally mounted on a bracket 87 secured to the front wall of member 15. A short coil spring 89 biases the catch 85 to its latching position.

The photo-electric cell 51 comprises a light-sensitive cathode 91 and an anode 93. When the cathode 91 is exposed to light rays, free electrons are emitted therefrom and if the anode 93 is energized these electrons are attracted by and to the anode, thereby varying the conductivity of the photo-electric cell 51.

An amplifier tube of the grid controlled rectifier type is indicated at 95, the filament of the tube being indicated by 97, the cathode by 99, the control grid by 101, the shield grid by 103, and the anode by 105. The filament 97 is energized by a small secondary winding 107 of a transformer 109.

I provide supply circuit terminals 111 and 113 to energize the toast heating elements as well as the transformer 109 when the main switch 75 has been closed as hereinbefore described. A conductor 115 connects terminal 111 to fixed contact 79 while fixed contact 77 is connected by a conductor 117 to one terminal of the primary winding of transformer 109, the other terminal of which is connected by a conductor 119 with the second contact terminal 113 of the toaster.

A grid controlled rectifier tube of the type hereinbefore set forth, assuming the filament 97 to be heated and a positive potential applied to the anode, will remain non-conducting as long as the grid 101 is biased more negatively than a predetermined critical value, but becomes conducting as soon as the negative bias decreases below this value. Once conduction through such a tube starts the grid has no further control and current will pass through the tube as long as its plate, or anode potential, remains positive.

Conductor 117 and terminal 77 are connected by a conductor 121 to the upper terminal of a voltage divider, designated generally by numeral 123 and comprising three separate resistors 125, 127 and 129 connected in series circuit relatively to each other, the other end of resistor 129 being connected to conductor 119. The anode 105 of tube 95 is connected to terminal 77 through a relay coil 135 and through a resistor 133. A condenser 131 is connected across the terminals of relay coil 135. The photo-electric cell 51 has its cathode 91 connected to conductor 119 at the bottom of voltage divider 123 and its anode 93 is adjustably connected to the central portion of resistor 127 of the voltage divider 123 through a resistance 137. The grid 101 of amplifier tube 95 is connected to conductor 139 which extends from anode 93 to one terminal of resistor 137. The cathode 99 and the shield grid 103 of tube 95 are connected to a conductor 141 extending from one terminal of secondary coil 107 to the junction of resistors 127 and 129.

When the main switch 75 is closed full line voltage is impressed across the voltage divider 123 and the filament 97 of tube 95 is energized. Part of the voltage across the voltage divider between its upper end and the junction of resistors 127 and 129 is impressed between the cathode 99 and the anode 105 of the amplifier tube 95. Voltage from the voltage divider is also impressed across the photo tube 51, between the adjustable tap 143 connected to one end of the resistor 137 and the lower end of voltage divider 123. It is to be noted that when the toaster is energized from an alternating current source of supply of electric energy, positive potential is supplied to the anodes of the photo tube and of the amplifier tube on every other half cycle only and the operation of the control circuit will therefore be caused at the time when the upper end of voltage divider 123 is at positive potential.

At such positive half cycles the anodes of both the photocell tube 51 and of amplifier tube 95 are at positive potential and the cathodes are at negative potential. The control grid 101 of amplifier tube 95 is biased negatively with respect to the cathode 99 by reason of the voltage drop through the lower portion 129 of voltage divider 123, which voltage is impressed on the grid 101 through the photocell 51. It should be noted that resistance 137 in series with the photocell 51, is connected in parallel with the resistance between tap 143 on resistor 127 and resistor 129 of the voltage divider 123. The resistance of the photocell 51 increases when the amount of light falling on photocell 51 decreases and the amount of negative grid bias on amplifier tube 95 therefore decreases with a decrease in illumination of photocell 51. The tap 143 on voltage divider 123 is therefore adjusted so that negative bias on grid 101 decreases to its critical value at the time when a piece of toast in the toasting member reaches the desired coloring or browning.

To produce toast of various shades of browning, such as light, medium or dark, it is only necessary to move the adjustable tap 143 on the voltage divider. If lighter toast is desired the voltage tap 143 is moved downwardly in the diagram shown in Fig. 6, and if darker toast is desired the voltage tap 143 is moved upwardly.

The condenser 131 connected in parallel to relay coil 135 is preferably of five microfarads capacitance and is used to produce a fairly uniform pull over the complete A. C. cycle, and resistance 133 may have a resistance of approximately 1500 ohms to limit the load current through amplifier tube 95.

Relay coil 135 is provided with an armature 145 pivotally connected to catch 85, and when energized is adapted to move catch 85 in a counter-clockwise direction to release latch 83 and permit spring 71 to move bread carrier 61 and a slice of bread thereon into its upper or non-toasting position.

Practical values of the various resistors may be substantially as follows: Resistor 137 may have five megohms resistance, resistor 129 may have 150 ohms resistance, resistor 127 may have 2000 ohms resistance and resistance 125 may have 3000 ohms resistance. The photocell tube 51 may be of the gas or of the vacuum type and the amplifier tube 95 may be of the gas-filled, grid-controlled rectifier type.

Referring now to Fig. 2 of the drawings, I have there illustrated a modified form of toaster embodying my invention and comprising a pair of toast heating elements 27 and 29 together with substantially parabolic reflectors 35 and 37 for heating and toasting one side of a slice of bread 21, while the other side of a slice of bread may be toasted by a planar heating element 147.

The optical system is also slightly modified and comprises a rod 149 having its upper and substantially vertically extending end formed to the curvature of a convex lens and its lower end flat. The upper end is adapted to be positioned between the lower edge of upper reflector 35 and the upper edge of lower reflector 37 while its lower end is located adjacent to photocell 51. The upper and lower ends of tube 149 permit the entrance and exit respectively of light rays reflected from a slice of bread being toasted. The outside cylindrical walls of the optical part must be highly polished to reflect outward bound light rays and to propagate all such rays within the outer walls. Material suitable for tube 149 is available at the present time and may for instance comprise methyl methacrylate, a plastic now made by Rohm & Haas Company. The light rays from one side of bread slice 21 may be considered as being piped from the surface of the lens-formed aperture to the flat surface of tubular member 149, ending directly above or in front of the photo-electric cell 51.

Referring now to Fig. 3 of the drawings, I have there illustrated a still further modification of toaster embodying my invention in which a photocell 51 is adapted to be positioned between the upper reflector 35 and a lower reflector 37, the rest of the details of construction of the toaster being substantially the same as that shown in Fig. 2.

Referring now to Fig. 5 of the drawings, I there show a still further modification of toaster embodying my invention. The casing 151 is provided with two slots 153 and 155 so that two slices of bread 21 and 157 may be simultaneously toasted. Two photocell tubes 51 are positioned in substantially the same position as shown in Fig. 3 of the drawings. Planar heating elements 159 are provided to toast respectively the inner surfaces of the two slices of bread 21 and 157.

Instead of having the parabolic reflectors mounted at the top and at the bottom of the toasting compartment they may be arranged vertically along the two vertical edges, thereby permitting the optic system to be subjected to a draft of cool air throughout its full length, which is particularly advantageous when employing a plastic optical system.

Various modifications may be made in the device embodying my invention without departing from the spirit and scope thereof and I desire that all such modifications coming clearly within the scope of the appended claims shall be considered a part of my invention.

I claim as my invention:

1. An automatic toaster comprising two heat-radiating spaced-apart elements facing the outside surface of a slice of bread being toasted, a reflector for each element to cause the heat from each element to be radiated over a part of said slice larger than one-half of said outside surface of said slice of bread, a wide angle lens positioned between said elements and adapted to receive light rays reflected from a major portion of said slice surface, a photo-electric cell and means controlled by said photo-electric cell for terminating a toasting operation, said lens being aligned with the space between said elements for receiving light directly from said slice.

2. In an electric toaster comprising means for supporting a slice of bread, heating means for toasting said bread, and means responsive to light reflected from the bread for controlling a toasting operation, the improvement wherein said heating means comprise a pair of elongated heating elements for one side of such a slice, and a pair of elongated reflectors lying substantially parallel and facing said side, said reflectors being spaced apart, and wherein the control means comprise a wide angle lens in the opening between said reflectors adapted to receive light rays reflected from a major portion of said bread surface and light responsive means adapted to receive light transmitted through said lens.

3. The combination of claim 2 wherein said two spaced reflectors are tilted toward the center of the slice position so that their beams converge slightly for providing a uniform distribution of heat over the entire face of a slice of bread being toasted.

4. An automatic electric toaster comprising a casing housing a toasting compartment, two heat-radiating spaced-apart elements adapted to face the outer surface of a slice of bread being toasted in said compartment, a reflector for each heating element adapted to cause the heat from each element to be radiated over a part of the outer surface of said bread slice larger than half the area of the bread slice, the reflectors for the heating elements defining between them a space facing the central area of the outside surface of the bread slice for transmitting light reflected directly from at least the central area of the outside surface of the bread slice in response to heating by said heating elements, a photo-electric cell responsive to reflected light from the bread slice transmitted through said space, a base housing a relatively cool base compartment having openings for circulating air therethrough and said base compartment housing the photo-electric cell, means for transmitting reflected light from said space to the photo-electric cell in said base compartment, and means controlled by said photo-electric cell for terminating a toasting operation.

5. The structure as set forth in claim 1 including means defining a light path from said lens to a relatively cool portion of the toaster, said light responsive means being located in said cool portion for receiving the light transmitted through said lens and said light path defining means.

6. The structure as set forth in claim 1 including a prism in the path of the light rays passing through said lens for redirecting said light to said light responsive means, said light responsive means being located in a relatively cool portion of said toaster.

BROR G. OLVING.

REFERENCES CITED

The following references are of record in the file of this patent:

UNITED STATES PATENTS

| Number | Name | Date |
|---|---|---|
| 1,556,288 | Ledig | Oct. 6, 1925 |
| 1,656,848 | Wyatt | Jan. 17, 1928 |
| 1,955,026 | Savage | Apr. 17, 1934 |
| 1,972,682 | Fitzgerald | Sept. 4, 1934 |
| 2,048,740 | Geffeken et al. | July 28, 1936 |
| 2,110,748 | Tweedale | Mar. 8, 1938 |
| 2,139,489 | Cockrell | Dec. 6, 1938 |
| 2,262,498 | Holm-Hansen | Nov. 11, 1941 |
| 2,275,265 | Mead | Mar. 3, 1942 |
| 2,315,327 | Gomersall | Mar. 30, 1943 |
| 2,341,546 | Hagenbook | Feb. 15, 1944 |
| 2,415,963 | Olving | Feb. 18, 1947 |
| 2,436,575 | Johnson | Feb. 24, 1948 |
| 2,459,169 | Koci | Jan. 18, 1949 |